(12) United States Patent
Innes

(10) Patent No.: US 10,389,822 B2
(45) Date of Patent: Aug. 20, 2019

(54) AUTOMATED ADDRESS FAILOVER FOR RECEIVERS AND BROWSERS USING A CLOUD SERVICE

(71) Applicant: Citrix Systems, Inc., Fort Lauderdale, FL (US)

(72) Inventor: Andrew Innes, Cambridge (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 150 days.

(21) Appl. No.: 15/712,405

(22) Filed: Sep. 22, 2017

(65) Prior Publication Data

US 2019/0098095 A1    Mar. 28, 2019

(51) Int. Cl.
*H04L 29/14*    (2006.01)
*H04L 29/08*    (2006.01)

(52) U.S. Cl.
CPC ........ *H04L 67/148* (2013.01); *H04L 67/1034* (2013.01); *H04L 67/1097* (2013.01); *H04L 67/2842* (2013.01); *H04L 69/40* (2013.01); *H04L 67/02* (2013.01); *H04L 67/142* (2013.01)

(58) Field of Classification Search
None
See application file for complete search history.

(56) References Cited

U.S. PATENT DOCUMENTS

| 2012/0054286 | A1* | 3/2012 | Kieselbach | G06Q 10/06 709/206 |
| 2014/0304804 | A1* | 10/2014 | Lee | H04L 63/0272 726/15 |
| 2016/0294955 | A1* | 10/2016 | Neidermyer | H04L 43/0811 |

OTHER PUBLICATIONS

Ramprasadtech: "Citrix XenApp and Desktop (Studio) Questions & Answers," Aug. 23, 2011, XP002787582.

* cited by examiner

*Primary Examiner* — Brian Whipple
(74) *Attorney, Agent, or Firm* — Fox Rothschild LLP; Robert J. Sacco; Carol E. Thorstad-Forsyth

(57) ABSTRACT

Systems and methods for automated address failover for a Computing Device ("CD"). The method comprise: accessing the Cloud Service ("CS") by CD; performing system caching operations by CD to locally store (a) an offline copy of a StoreFront web UI for a main StoreFront provided by CS and (b) a plurality of Cloud Connector addresses; transmitting a silent request from a Receiver of an Application/Desktop delivery solution being executed by CD to each of the CS and the Cloud Connector addresses; operating the Receiver using an address for CS for web API calls to the main StoreFront, if CS responded to the silent request; and operating the Receiver or a Webview using one of the Cloud Connector addresses that is associated with a reachable Cloud Connector for web API calls to a backup StoreFront, if CS did not respond to the silent request.

18 Claims, 6 Drawing Sheets

AUTOMATED ADDRESS FAILOVER FOR RECEIVERS AND BROWSERS USING A CLOUD SERVICE

BACKGROUND

Statement of the Technical Field

The present disclosure relates generally to computing systems. More particularly, the present disclosure relates to implementing systems and methods for automated address (e.g., Universal Resource Locator ("URL")) failover for Receivers of Application/Desktop delivery solutions and Web Browsers using a cloud service.

Description of the Related Art

A conventional Workspace Service ("WS") uses a cloud hosted StoreFront for end users to obtain access to applications and virtual desktops. The term "StoreFront", as used here, refers to an enterprise application store that provides an interface for users to access virtual desktops and applications. For some customers, the cloud is used as a brokering service for users who are using on-premises software ("on-prem") to obtain access to host devices of Application/Desktop delivery solutions (e.g., XenApp/Xen Desktop ("XA/XD"). The StoreFront is susceptible to loss of cloud connectivity.

SUMMARY

The present disclosure concerns implementing systems and methods for automated address failover for a computing device. The methods comprise: accessing the cloud service by the computing device; performing system caching operations by the computing device to locally store (a) an offline copy of a StoreFront web User Interface ("UI") for a main StoreFront provided by the cloud service and (b) a plurality of Cloud Connector addresses; transmitting a silent request from a Receiver of an Application/Desktop delivery solution being executed by the client computing device to each of the cloud service and the plurality of Cloud Connector addresses; operating the Receiver using an address for the cloud service for web Application Programming Interface ("API") calls to the main StoreFront, if the cloud service responded to the silent request; and operating the Receiver or a Webview using one of the plurality of Cloud Connector addresses that is associated with a reachable Cloud Connector for web API calls to a backup StoreFront, if the cloud service did not respond to the silent request.

In some scenarios, the system caching operations are performed by a Web Browser, the StoreFront web UI, or the Receiver of the Application/Desktop delivery solution. The Receiver is a Web Receiver or a Native Receiver. The Web Receiver is configured to operate with a Web Browser, while the Native Receiver is configured to provide a Webview. Both of these Receivers comprise client software that is required to access applications and full desktops hosted by servers remote from the computing device.

The computing device loads the offline copy of the StoreFront web UI at least when the cloud service is unreachable. The client computing device also generates a list of addresses associated with at least one of the cloud service and Cloud Connectors that responded to the silent request. The reachable Cloud Connector is authenticated prior to when the web API calls are made to the backup StoreFront. The silent requests are transmitted each time a new StoreFront session is started, and/or each time a user-software interaction is received to perform an operation via the Receiver or Webview. The operation can include, but is not limited to, an application launch or an application refresh.

BRIEF DESCRIPTION OF THE DRAWINGS

The present solution will be described with reference to the following drawing figures, in which like numerals represent like items throughout the figures.

DETAILED DESCRIPTION

Figure 1:
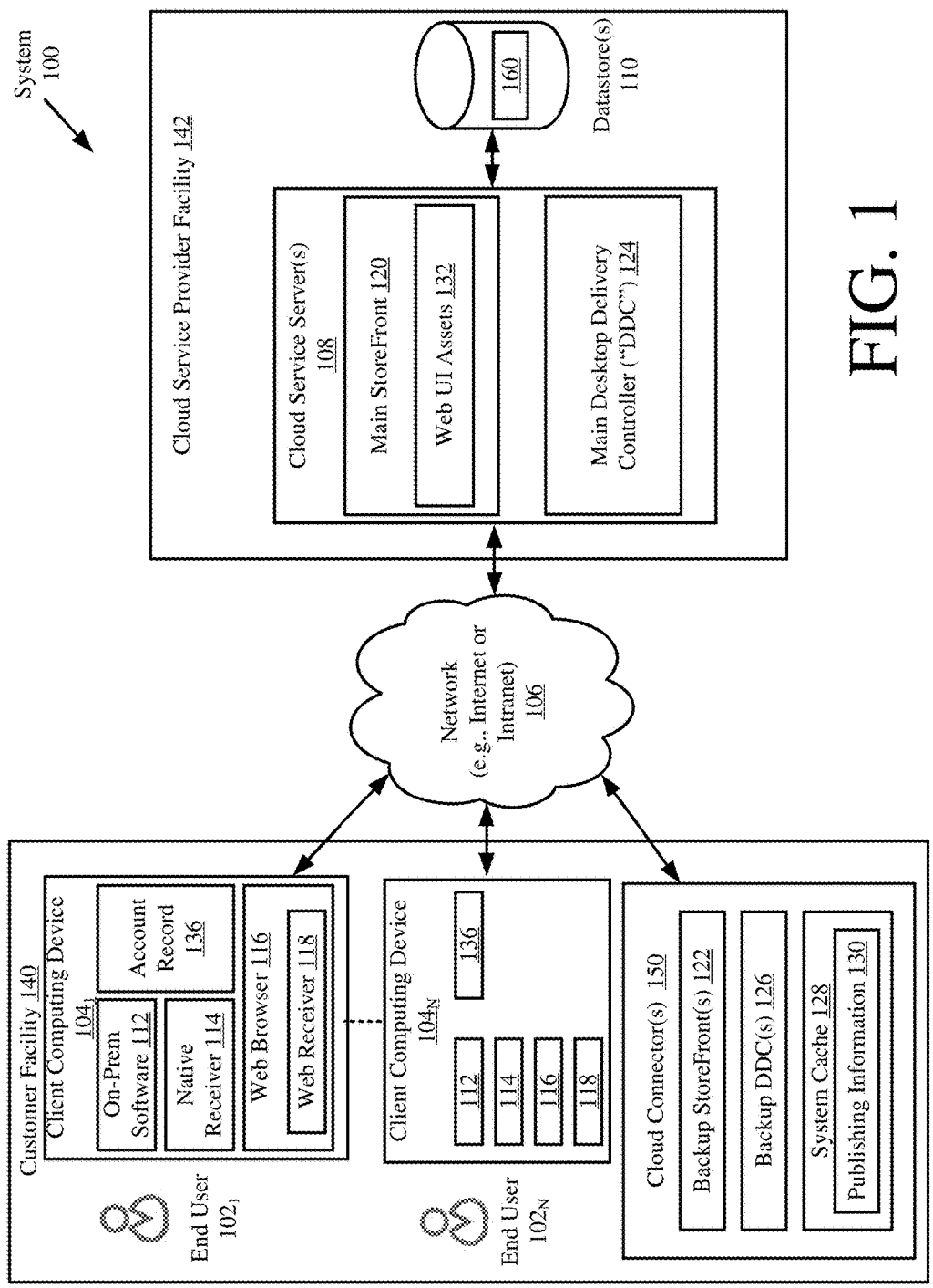
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As discussed above in the Background Section of this paper, conventional WSs use a cloud hosted StoreFront for end users to obtain access to applications and virtual desktops. For some customers (e.g., a business organization), the cloud is used as a brokering service for end users (e.g., employees) who are located on premises (or are using on-prem) to get access to hosts of Application/Desktop delivery solutions that are also located on-premises. A fallback access mechanism is needed to make the brokering service resilient to loss of cloud connectivity. That is, only needing connectivity to components that are located on-premises. The intention is that the business organization could completely lose their Internet access, not just to the cloud hosted StoreFront, and the solution would still allow people to access their on-prem desktop applications. To be effective, the fallback mechanism should operate automatically without additional customer setup or intervention, let alone requiring end user knowledge or behavior changes.

While it is possible, and even necessary in some cases, to explicitly reconfigure end point devices to point to the new StoreFront address (e.g., URL), or to explain to users how to reconfigure their Receiver of an Application/Desktop delivery solution to use a new address (e.g., URL), it is highly desirable for address (e.g., URL) changes to propagate automatically to Receivers and Web Browsers without end user intervention. The term "Receiver", as used herein, refers to a Native Receiver and/or a Web Receiver having a client component of an Application/Desktop delivery solution (e.g., XA/XD) that is configured to access full desktops and individual applications from a centralized host (e.g., a server or a cloud infrastructure). The term "Web Browser", as used herein, refers to a software application for retrieving, presenting and traversing information resources on the World Wide Web ("WWW"). Each information resource is identified by a URL. The information resources can include, but are not limited to, web pages, images, videos, and other content. Automatic propagation needs to be complemented with monitoring tools that will track the success of this process and identify the users or devices that are still using old addresses (e.g., URLs), in order to allow the customer to smoothly manage the process and determine when the old address (e.g.,. URL) can be decommissioned or relinquished.

The present solution builds on the proposal that a Cloud Connector (e.g., a server joined to an Active Directory) can (as a customer selected option) include a "hidden" or backup StoreFront component and a backup Desktop Delivery Controller ("DDC") component that are automatically configured to provide backup access to cloud managed resources located on-prem. The backup DDC component maintains a cache of relevant publishing information from the cloud Application/Desktop delivery service by leveraging a local host cache mechanism, and the backup StoreFront component is auto-configured by the Cloud Connector with the addresses of the local Connector DDC(s) and any other on-prem Application/Desktop delivery solution deployments that are being aggregated by the cloud StoreFront. On-prem Virtual Desktop Agents ("VDAs") managed by the cloud already use the Cloud Connectors as their proxy registration point for the cloud DDC so no change is required there other than to funnel the registration requests to the backup DDC when forwarding to the cloud DDC fails.

The remaining challenge is that Receiver end points do not know about the Cloud Connectors, and do not have logic to switch to a backup DDC's address (e.g., URL) on connection failure, so will not automatically failover to the backup components. Custom fallback logic can be added to Native Receivers (e.g., Citrix Receivers). A similar solution is needed for Web Browsers as well since that is still the most common mode of access by most end users. The switching logic also needs to account for the security risks inherent in attempting to contact an internal network resource from an end point that may be connected to an external network such as the Internet. The security protection measures should impose as little burden as possible on customers to enable.

A related problem is that the StoreFront is designed to have a single load balanced address for multiple servers, so that Receivers have only one address (e.g., URL) to deal with regardless of the scale of the StoreFront deployment. If no changes were made that would mean customers must configure a load balanced address for the Cloud Connectors and deploy a load balancing mechanism such as Windows Network Load Balancing ("NLB") or NetScaler, and potentially issue a Transport Layer Security ("TLS") server certificate for the Load Balanced ("LB") address to all of the Cloud Connectors. That would constitute significant extra administrative work which is in conflict with the model that the Cloud Connector machines are fully managed by the cloud and can be replaced or supplemented by adding new instances as needed. Not using all available Cloud Connectors for backup would increase the risk of failure in a failover situation, for example by putting too much load on a single Cloud Connector.

In view of the forgoing, the present solution relates to implementing systems and methods for automated address (e.g., URL) failover for Receivers and Web Browsers using a cloud service. In some scenarios, HTML5 offline mechanisms, and the equivalent for X1 class Native Receivers, are used to enable Receivers and Web Browsers to automatically failover to using backup Cloud Connectors or equivalent servers for local Application/Desktop delivery solution resource access.

Unlike conventional solutions for a PNAgent client using a web interface, the present solution works for Web Browsers as well as Native Receivers, and when used with StoreFront does not require the customer to perform any explicit configuration work such as defining backup server addresses (e.g., URLs). Because the present solution is automatically configured, there is no danger that the customer may specify inappropriate servers as backups, such as servers with incompatible configuration settings or resource feeds compared with the primary server. If the configurations do not match properly, Native Receivers can become confused about the status of subscribed applications and think that applications have been withdrawn rather than just being unavailable. Particularly when applications are streamed to the device, it can have bad consequences for the end user if the local application copy is deleted incorrectly. This was a recurring problem that plagued the PNAgent solution when used with App Streaming ("AS"). The term "App Streaming", as used here, refers to a form of ondemand software distribution in which only essential portions of an application's code needs to be installed on a client device (i.e., while an end user performs actions in the applications, the necessary code and files are delivered to the client device over the network 106 as and when they are required).

When testing whether a backup address (e.g., URL) for an internal server (e.g., a Cloud Connector available from Citrix Systems, Inc. of Florida) is reachable, the present solution includes measures to prevent mistaken connections to incorrect hosts, for example if the end point device is on an external network. User credentials can be given automatic protection even if TLS is not used.

Referring now to FIG. 1, there is provided an illustration of an illustrative system 100. System 100 implements methods for automated address (e.g., URL) failover for Native Receivers 114 and Web Browsers 116 using a cloud service. In this regard, system 100 comprises a customer facility 140 and a cloud service provider facility 142. The customer facility 140 comprises one or more buildings of a customer, such as a business organization. The customer has a plurality of end users $102_1$-$102_N$. The end users can include, but are not limited to, employees. The end users $102_1$-$102_N$ respectively use client computing devices $104_1$-$104_N$ for a variety of purposes, such as accessing and using cloud services provided by a cloud service provider. In this regard, the client computing devices $104_1$-$104_N$ are configured to facilitate access to applications and virtual desktops without interruptions resulting from connectivity loss. Accordingly, the client computing devices $104_1$-$104_N$ have installed thereon and execute various software applications. These software applications include, but are not limited to, on-prem software 112, Native Receivers 114, Web Browsers 116, and/or Web Receivers 118.

In some scenarios, the Native Receivers 114 and Web Receivers 118 can respectively include, but are not limited to, Citrix Receivers available from Citrix Systems, Inc. of Florida and Citrix Receivers for a web site available from Citrix Systems, Inc. of Florida. Citrix Receivers comprise client software that is required to access applications and full desktops hosted by servers remote from client devices. The present solution is not limited in this regard.

The client computing devices $104_1$-$104_N$ also have various information stored internally. This information includes, but is not limited to, account records 136. The client computing devices $104_1$-$104_N$ are able to communicate with each other via an Intranet and with external devices via the Internet. The Intranet and Internet are shown in FIG. 1 as a network 106.

The external devices include one or more cloud service servers 108 located at the cloud service provider facility 142. The cloud service provider facility 142 comprises one or more buildings of a cloud service provider. The server(s) 108 is(are) configured to facilitate access to applications and virtual desktops without interruptions resulting from connectivity loss. Accordingly, the server 108 has installed thereon and executes various software applications. The software applications include, but are not limited to, a main StoreFront 120 and a main Desktop Delivery Controller ("DDC") 124. StoreFronts and DDCs are well known in the art, and therefore will not be described herein. Any known or to be known StoreFront and/or DDC can be employed herein. The server 108 is also configured to access the datastore 110 in which publishing information 160 is stored, and is also able to write/read from the datastore(s) 110.

Cloud Connector(s) 150 is(are) also provided in system 100. The cloud connector(s) is(are) located at the customer facility 140. Cloud Connectors are well known in the art, and therefore will not be described in detail herein. Any known or to be known Cloud Connector can be used herein without limitation provide that it is configured to provide a backup StoreFront and DDC. In all scenarios, each Cloud Connector comprises a server.

In some scenarios, each Cloud Connector hosts a backup StoreFront 122 and a backup DDC 126. Each Cloud Connector has a system cache 128 on which publishing information 130 is stored. The publishing information includes all of or a portion of the publishing information 160 stored in datastore 110. The publishing information 130, 160 includes, but is not limited to, software applications, code, and/or media content (e.g., text, images, videos, etc.).

In other scenarios, the backup StoreFront and DDCs are installed on separate machines from the Connectors, provided they are still linked to the system cache. The system cache may be managed by the Cloud Connectors, but might be stored on the separate machines hosting the backup StoreFronts and DDCs, or replicated to those machines from the Cloud Connectors.

In some scenarios, the present solution takes advantage of the Receiver X1 design of a common web User Interface ("UI") for both Web Browsers 116 and Native Receivers 114. Native Receivers 114 work by downloading the web UI assets 132 ahead of time from the main StoreFront 120 using a simplified version of the HTML5 offline application cache pattern, while the Web Receiver 118 is changed to use the standard HTML5 mechanisms (application cache or potentially Service Worker) to do the same for the Web Browser 116. In some scenarios, a system cache updater components are provided with the cloud service 108, which communicates with the system cache 128. Notably, the Web Receiver 118 includes a Web UI application running in the Web Browser 116.

Receiver 114 and Web Browsers 116 automatically check for changes to the web UI assets 132 and opportunistically update the local cache of these assets when there is connectivity to the main StoreFront 120, and can therefore load and run the cached web UI assets 132 even when there is no connectivity to the main StoreFront 120.

Cached knowledge of backup addresses (e.g., URLs) is needed to then support failover when cloud connectivity is lost. A natural approach is to use a Discovery Document or other metadata for the StoreFront 120, and have that be downloaded and cached in HTML5 local storage for the Web Browser case. It is already saved on disk or registry by the Native Receivers 114.

To protect against inadvertent connection to the wrong host when attempting to contact a Cloud Connector address (e.g., URL), several measures can be used to complement or substitute for the default recommendation of TLS protection: restriction to non-replayable authentication methods; an application layer authentication mechanism where the server proves knowledge of a secret; application layer protection of replayable credentials; and policy controls that allow the Cloud Connector addresses (e.g., URLs) to only be used by end points that have external safe-guards (e.g., disabling backup URL caching by default but enabling it for specific end points known to be on the internal network using a local policy override).

Figure 2:
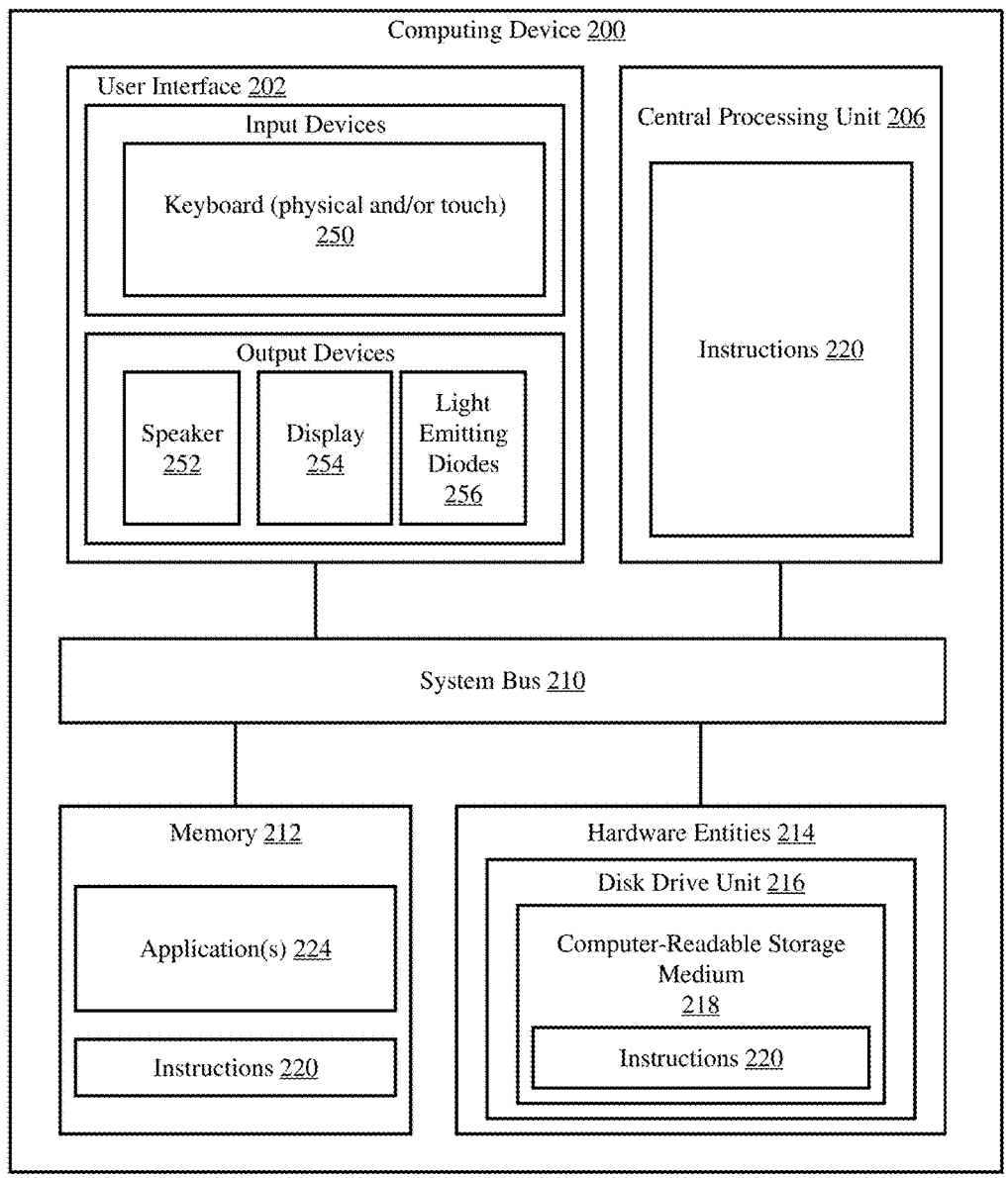
FIG. 2 is an illustration of an illustrative computing device.

Referring now to FIG. 2, there is provided an illustration of an exemplary architecture for a computing device 200. Computing devices $104_1$-$104_N$, Cloud Connector(s) 150, and server(s) 108 of FIG. 1 (is)are the same as or similar to computing device 200. As such, the discussion of computing device 200 is sufficient for understanding these components of system 100.

In some scenarios, the present solution is used in a client-server architecture. Accordingly, the computing device architecture shown in FIG. 2 is sufficient for understanding the particulars of client computing devices and servers.

Computing device 200 may include more or less components than those shown in FIG. 2. However, the components shown are sufficient to disclose an illustrative solution implementing the present solution. The hardware architecture of FIG. 2 represents one implementation of a representative computing device configured to enable automated address (e.g., URL) failover for Receivers of Application/Desktop delivery solutions and Web Browsers using a cloud service, as described herein. As such, the computing device 200 of FIG. 2 implements at least a portion of the method(s) described herein.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices and output devices, which facilitate user-software interactions for controlling operations of the computing device 200. The input devices include, but are not limited, a physical and/or touch keyboard 250. The input devices can be connected to the computing device 200 via a wired or wireless connection (e.g., a Bluetooth® connection). The output devices include, but are not limited to, a speaker 252, a display 254, and/or light emitting diodes 256.

At least some of the hardware entities 214 perform actions involving access to and use of memory 212, which can be a Radom Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies of the present disclosure.

Figure 3A:
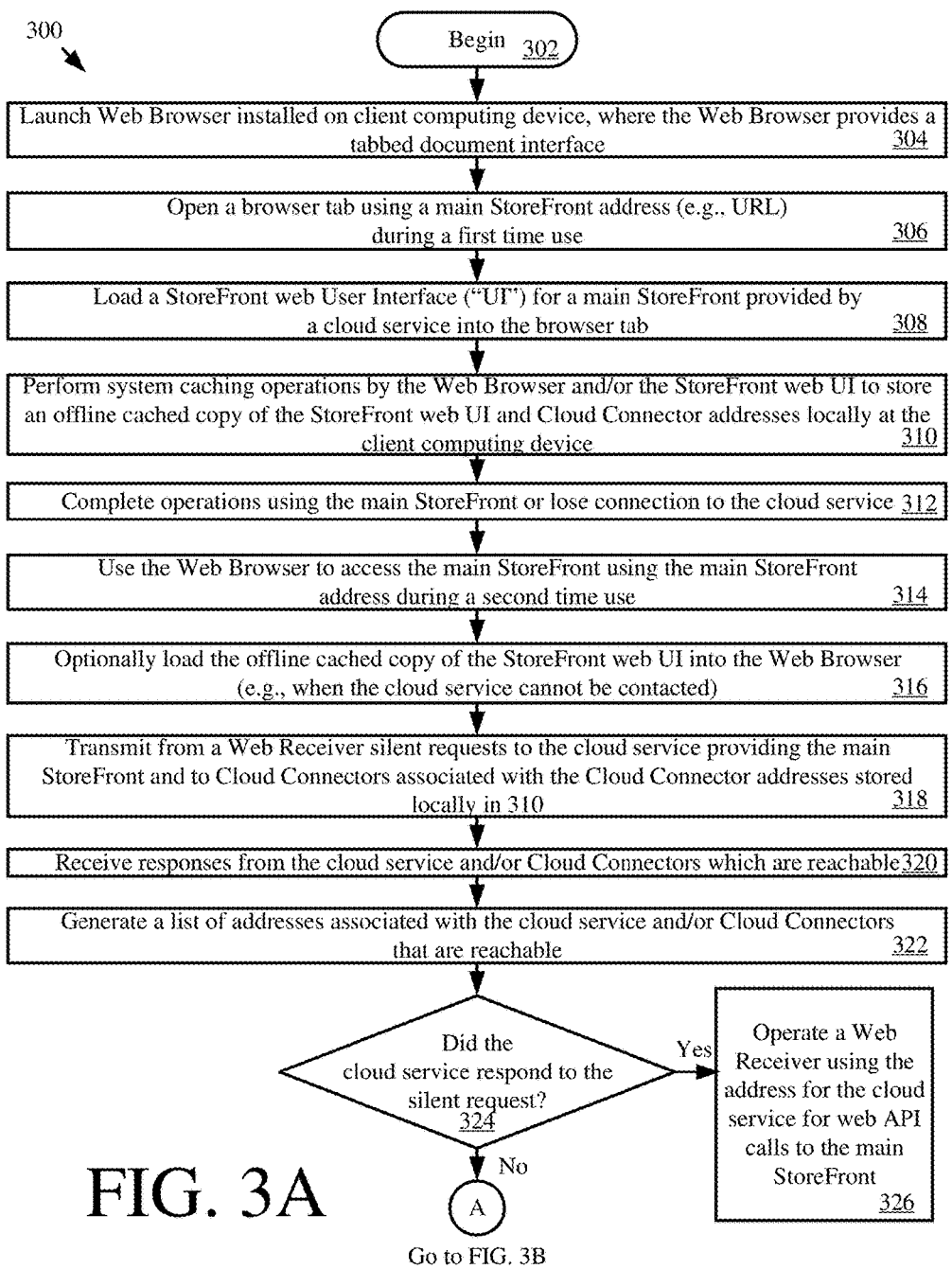
FIGS. 3A-3B (collectively referred to as "FIG. 3") provide a flow diagram of an illustrative method for operating a Web Receiver.

Referring now to FIG. 3, there is a flow diagram of an illustrative method 300 for operating a Web Browser (e.g., Web Browser 116 of FIG. 1). Method 300 begins with 302 and continues with 304 where actions are performed for a First Time Use ("FTU") of a cloud service. In this regard, an end user (e.g., end user 102₁ of FIG. 1) launches the Web Browser installed on a client computing device (e.g., client computing device 104₁ of FIG. 1). In some scenarios, the Web Browser provides a Tabbed Document Interface ("TDI") that can maintain multiple web pages or documents in a single window. Each item occupies the Web Browser's entire viewing area when displayed. Each item is selected for display via a respective one of a plurality of browser tabs. The present solution is not limited in this regard. The Web Browser can include a web browser that does not support tabs or multiple windows.

Next in 306, the end user opens a browser tab using a main StoreFront address (e.g., URL). As a result, a StoreFront web UI for a main StoreFront (e.g., main StoreFront 120 of FIG. 1) is loaded into the browser tab, as shown by 308. The main StoreFront is provided by a cloud service. System caching operations are performed in 310 by the Web Browser and/or the StoreFront web UI. The system caching operations are performed to store (a) an offline cached copy of the StoreFront web UI and (b) Cloud Connector addresses locally at the client computing device. The Cloud Connector addresses can include, but are not limited to, URLs and/or reverse proxy URLs. The URLs may reference the Cloud Connectors (e.g., Cloud Connectors 150 of FIG. 1) via a gateway. In 312, operations are completed using the main StoreFront or the connection to the cloud service is lost.

During a Second Time Use ("STU"), the Web Browser is used to access the main StoreFront using the main StoreFront address, as shown by 314. This time the offline cached copy of the StoreFront web UI is optionally loaded into the Web Browser. For example, the offline cached copy is loaded into the Web Browser when the cloud service cannot be contacted, as shown by 316.

At this time, the Web Receiver (e.g., Web Receiver 118 of FIG. 1) performs operations in 318 to transmit silent requests to the cloud service (e.g., cloud service server 108 of FIG. 1) providing the main StoreFront and to Cloud Connectors (e.g., Cloud Connector(s) 150 of FIG. 1) associated with the Cloud Connector addresses stored locally in 310. In some scenarios, the silent requests include Ajax calls with a configurable timeout chosen to limit failover delays to a reasonable length. Ajax calls are well known in the art, and therefore will not be described herein. In 320, the Web Receiver receives responses from the cloud service and/or Cloud Connectors which are reachable, i.e., those servers which responded to the respective silent request within the configured timeout interval. A list of addresses (e.g., URLs) is generated in 322. The addresses in the list are associated with the cloud service and/or the Cloud Connectors that are reachable. The present solution is not limited to list implementations. Tables, data maps and other data organization techniques can be used herein without limitation.

After the list generation, a decision is made as to whether the cloud service responded to the silent request. If so [324:YES], then 326 is performed where the Web Receiver operates using the address for the cloud service for web API calls to the main StoreFront. Web API calls are well known in the art, and therefore will not be described herein. If not [324:NO], then method 300 continues with 328 of FIG. 3B.

Figure 3B:
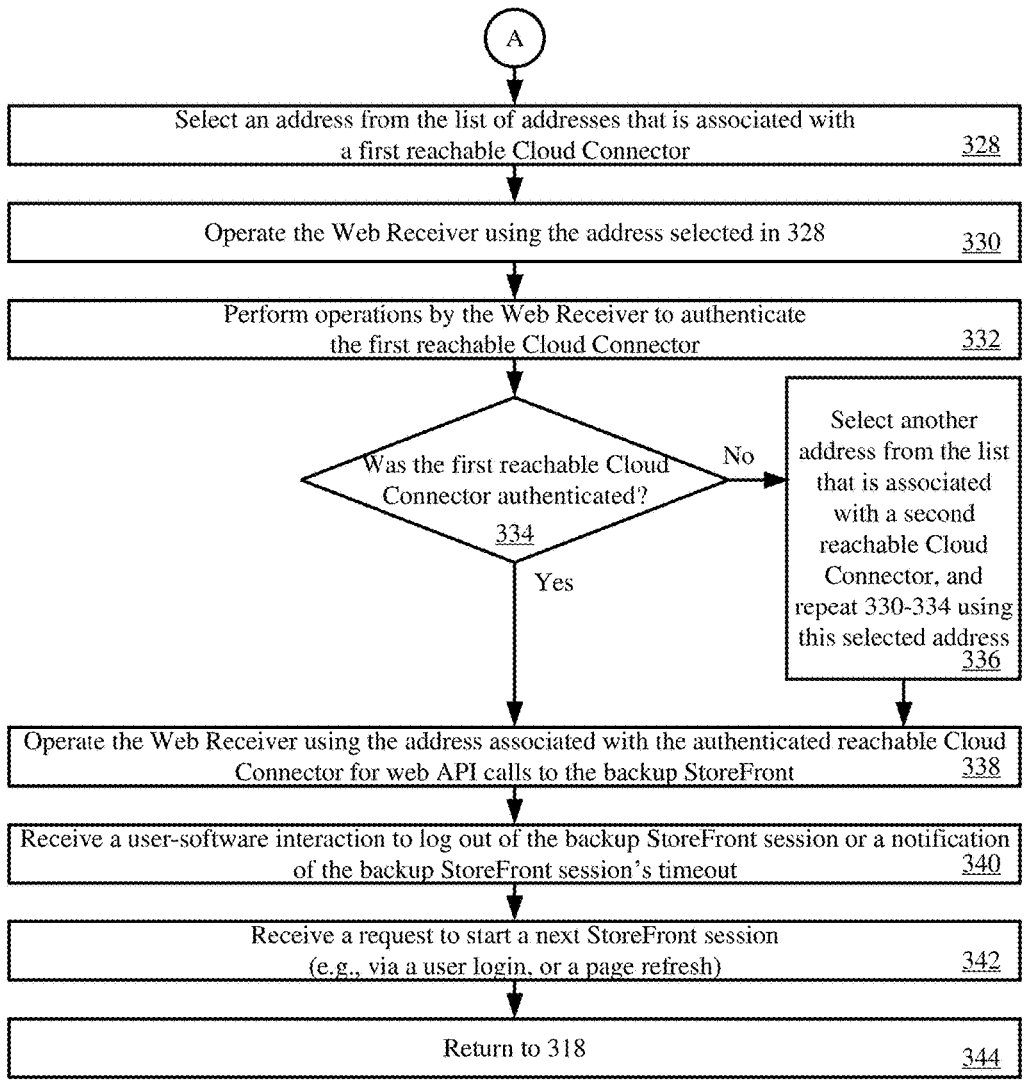

As shown in FIG. 3B, 328 involves selecting an address from the list of addresses that is associated with a first reachable Cloud Connector. The address can be selected randomly or in a pre-defined order. The Web Receiver then operates in 330 using the address selected in 328. In 332, the Web Receiver performs operations to authenticate the first reachable Cloud Connector. Techniques for authentication devices are well known in the art. Any known or to be known device authentication technique can be used herein without limitation.

Regardless of whether an address is meant for direct access or gateway proxied access, the Web Receiver must take care to detect when addresses are being resolved to the wrong server, such as when there is a captive network access portal (e.g., Hotel WiFi) or the DNS provider returns a landing page address for non-existent hosts. As a defense in depth precaution, Cloud Connectors should support an application protocol layer authentication mechanism to allow the Web Receiver to validate that it is reaching a valid Cloud Connector. For example, the Web Receiver could expose an unguessable random number on a well-known URL, where the number is reported to the StoreFront web UI's code from the main StoreFront, or a public/private key pair could be used if the Web Browser supports WebCrypto.

To support TLS access, the Cloud Connectors can use standard AD auto-enrollment mechanisms to obtain a machine certificate if the customer has deployed Microsoft AD Certificate Services as the internal Public Key Infrastructure ("PKI"). Otherwise, the customer could manually provision a server certificate for each Cloud Connector machine, or use a wildcard certificate that is included in a base machine image. If TLS is not enabled but the customer is unwilling to allow AD password credentials in the clear, the Cloud Connector's backup StoreFront instance could be configured to only support domain pass-through authentication (aka Kerberos/NTLM) which is relatively safe to use over an internal corporate network without TLS. This would support Web Receiver end points that have been deployed with the domain pass-through (SSON) component available for Windows Receiver as long as the Cloud Connector machines are in an Internet Explorer ("IE") zone that allows silent pass-through. It can also be used by virtually any Web Browser though it will trigger a browser password prompt if the end point device is not domain joined or the Web Browser does not support silent domain pass-through. The end user would then have another password prompt when connecting to the on-prem Application/Desktop session, but this is acceptable for a failover access scenario.

Alternatively, if WebCrypto can be used, then the password or other replayable credentials could be encrypted with the Cloud Connector's public key, after confirming that the server can sign a challenge with the corresponding private key.

Referring again to FIG. 3B, a determination is made in 334 as to whether the first reachable Cloud Connector was authenticated. If the first reachable Cloud Connector was not authenticated [334:NO], then 336 is performed where another address is selected from the list that is associated with a second Cloud Connector. This address is then used to repeat 330-334.

If the first or second reachable Cloud Connector was authenticated [334:YES], then 338 is performed where the Web Receiver operates using the address associated with the authenticated Cloud Connector for web API calls to a backup StoreFront (e.g., backup StoreFront 122 of FIG. 1). Next in 340, the Web Receiver receives a user-software interaction to log out of the backup StoreFront session or a notification of the backup StoreFront's timeout. At some later time, the Web Receiver receives a request to start a next StoreFront session (e.g., via a user login or a page refresh), as shown by 342. In response, 344 is performed where method 300 returns to 318.

Figure 4A:
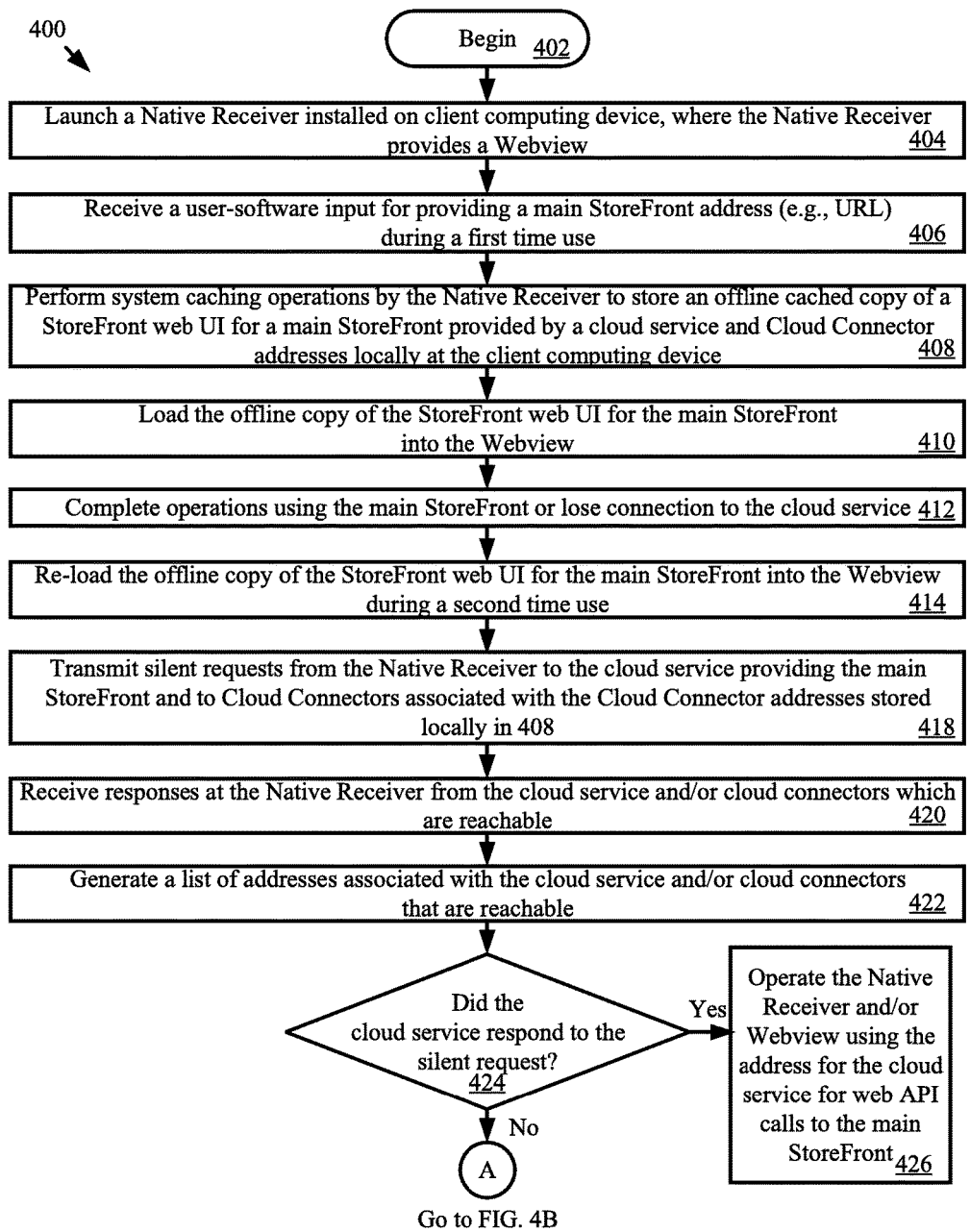
FIGS. 4A-4B (collectively referred to as "FIG. 4") provide a flow diagram of an illustrative method for operating a Native Receiver.
Figure 4B:
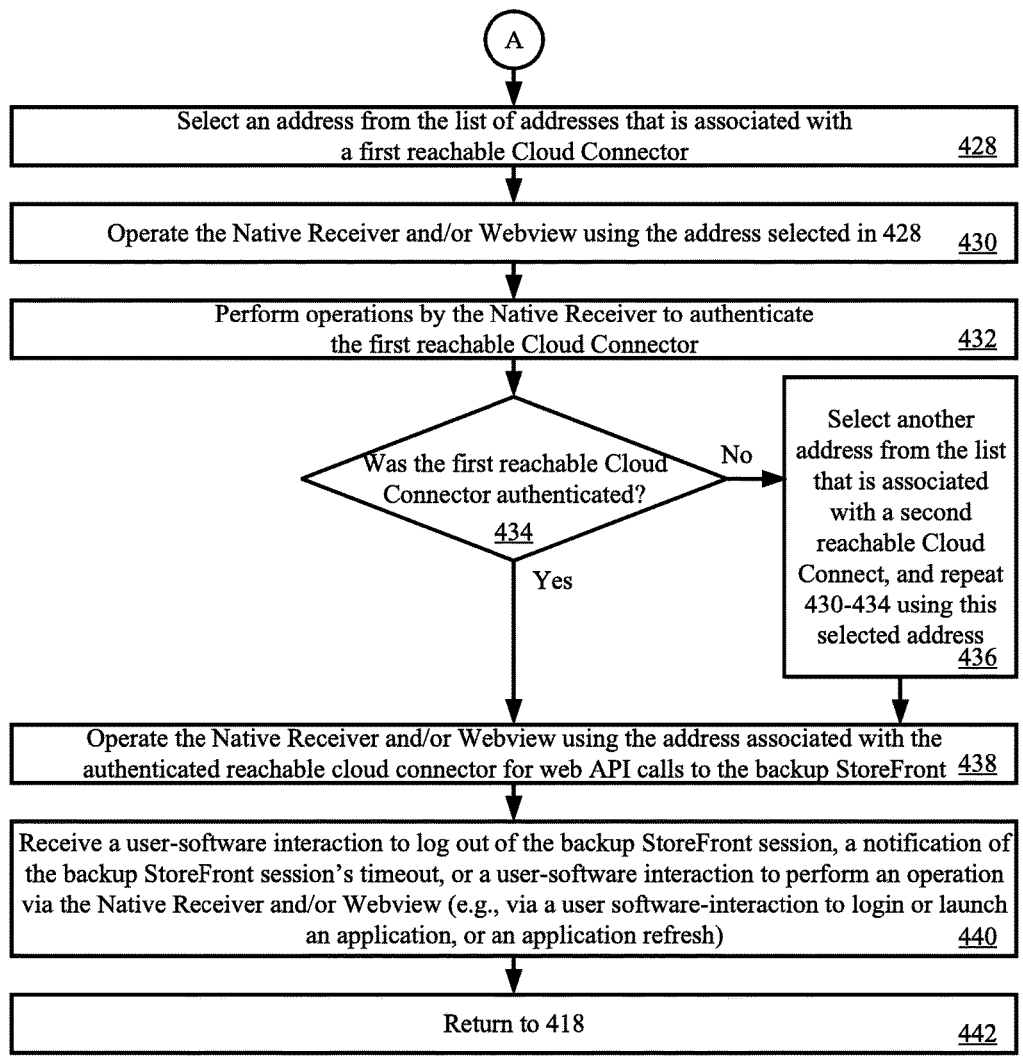

Referring now to FIGS. 4A-4B, there is provided a flow diagram of an illustrative method 400 for operating a Native Receiver (e.g., Native Receiver 114 of FIG. 1). As shown in FIG. 4A, method 400 begins with 402 and continues with 404 where an end user (e.g., end user $102_1$ of FIG. 1) launches the Native Receiver installed on a client computing device (e.g., client computing device $104_1$ of FIG. 1). The Native Receiver is configured to provide Webview. Webview is well known in the art, and therefore will not be described in detail herein. Still, it should be understood that Webview comprises a system component for an OS that allows software applications to display content from the WWW directly inside an application.

Next in 406, a user-software input is received by the client computing device for providing a main StoreFront address during an FTU. System caching operations are then performed in 408 by Native Receiver. The system caching operations are performed to store (a) an offline cached copy of a StoreFront web UI for a main StoreFront (e.g., main StoreFront 120 of FIG. 1) and (b) Cloud Connector addresses locally at the client computing device. The main StoreFront is provided by a cloud service. The Cloud Connector addresses can include, but are not limited to, URLs and/or reverse proxy URLs. The URLs may reference the Cloud Connectors (e.g., Cloud Connectors 150 of FIG. 1) via a gateway. Once the system caching operations are fully performed, the offline copy of the StoreFront web UI is loaded into the Webview as shown by 410. In 412, operations are completed using the main StoreFront or the connection to the cloud service is lost.

During an STU, the offline copy of the StoreFront web UI is re-loaded into the Webview as shown by 414. In 416, the Native Receiver transmits silent requests to the cloud service providing the main StoreFront and to Cloud Connectors associated with Cloud Connector addresses stored locally in 408. In 410, the Native Receiver receives responses from the cloud service and/or Cloud Connectors which are reachable, i.e., those servers which responded to the respective silent request. A list of addresses (e.g., URLs) is generated in 422. The addresses in the list are associated with the cloud service and/or the Cloud Connectors that are reachable.

After the list generation, a decision is made as to whether the cloud service responded to the silent request. If so [424:YES], then 426 is performed where the Native Receiver and/or Webview operate(s) using the address for the cloud service for web API calls to the main StoreFront. Web API calls are well known in the art, and therefore will not be described herein. If not [424:NO], then method 400 continues with 428 of FIG. 4B.

As shown in FIG. 4B, 428 involves selecting an address from the list of addresses that is associated with a first reachable Cloud Connector. The address can be selected randomly or in a pre-defined order. The Native Receiver and/or Webview then operate(s) in 430 using the address selected in 428. In 432, the Native Receiver performs operations to authenticate the first reachable Cloud Connector. Techniques for authentication devices are well known in the art. Any known or to be known device authentication technique can be used herein without limitation.

A determination is made in 434 as to whether the first reachable Cloud Connector was authenticated. If the first reachable Cloud Connector was not authenticated [334:NO], then 436 is performed where another address is selected from the list that is associated with a second Cloud Connector. This address is then used to repeat 430-434.

If the first or second reachable Cloud Connector was authenticated [434:YES], then 438 is performed where the Native Receiver and/or Webview operate(s) using the address associated with the authenticated Cloud Connector for web API calls to a backup StoreFront (e.g., backup StoreFront 122 of FIG. 1). Next in 440, the Native Receiver receives (a) a user-software interaction to log out of the backup StoreFront session, (b) a notification of the backup StoreFront's timeout, or (c) a user-software interaction to perform an operation via the Native Receiver and/or Webview (e.g., via a user-software interaction to login or launch an application, or via an application refresh). Subsequently, 442 is performed where method 400 returns to 418.

In some Native Receiver scenarios, an Auth Manager is used to mediate all network communication and authentication by the StoreFront web UI. The Native Receiver may also have a Native Store client component (such as the Self Service plugin on Windows) that operates in parallel to the StoreFront web UI and is used by the StoreFront web UI code to perform certain actions (such as application launch). The Native Store client component may be used without the StoreFront web UI code being loaded at all, for example when the user invokes shortcuts in the Windows Start menu or on the desktop, or file type association.

As a result, it is best for knowledge of the backup URLs to be handled by the Native Receiver code rather than the StoreFront web UI layer. This would operate at a generic Store API abstraction layer just above Auth Manager, which acts as a funnel point for API calls from either the StoreFront web UI or the Native Store client component. The abstraction layer would automatically direct API requests as needed to backup URLs on behalf of the calling code, with the addition of specialized return codes or signals that indicate when failover mode is in effect.

The Native Receiver loads the cached StoreFront web UI code immediately when the user opens the Native Receiver, ahead of attempting network communication to cloud's main StoreFront. When the StoreFront web UI code initiates an API request to StoreFront, the API request is routed through the Native Store API abstraction layer to the Auth Manager component. The Native Store client works similarly.

The Native Receiver maintains local configuration data for the cloud's main StoreFront which also provides knowledge of gateway access paths. The Auth Manager is able to make direct web service requests to any URL even if it is not associated with a configured store, and to respond to authentication challenges produced in response, so direct authentication to a Cloud Connector's backup StoreFront is straightforward. If the Cloud Connector is reachable via an on-prem NetScaler Gateway ("NSG"), then the Auth Manager is given knowledge of the network topology. This is done by explicitly defining a backup StoreFront for each Cloud Connector (with associated gateways and beacons) in the store's Discovery Document or service record, linked to the primary store.

When an API call is made, the Auth Manager consults separate reachability logic in the Native Receiver to determine if the main StoreFront's address (e.g., URL) is reachable, or if any relevant gateway connection path for that address is reachable. If the API request failed because of lack of reachability of the main StoreFront, but a backup StoreFront is reachable, then the API request is failed with a distinct error condition. The Store API abstraction layer will then initiate an automatic context switch to a backup StoreFront and retry the request. As previously mentioned, distinctive return codes or signals are used to inform the Store API client logic that failover mode is in effect.

There are other potential features that could be built on the basis of the present solution. Some customers have such large geographically distributed environments that they have multiple Application/Desktop delivery solution deployments for different geographical locations, and end users are trained to know which deployment is appropriate for performing particular tasks. Because of the large number of deployments dispersed around the world, aggregation of all deployments through a single StoreFront does not provide acceptable performance. The customers desire to have a universal "home screen" shown on all access devices, such as browser-based thin client terminals, which has a list of all deployments so the user can pick the relevant one before getting a login screen.

The present solution can be adapted to solve this scenario, such that the different deployments are treated as backup Stores listed by a particular Store that is considered primary for the purpose of delivering the universal (customized) web UI. The customized web UI shows the list of all Stores for the user to select, in lieu of automatic selection by the web UI code in the context of failover. The web UI code can then access the selected Store APIs as in the failover case. This works because all of the Store interactions are performed using Ajax, and cross-origin access is possible with appropriate Cross-Origin Resource Sharing ("CORS") configuration on each Store server. Because all of the Stores belong to the same organization, it is acceptable to have the web UI code controlled by one Store able to access resources on another server (and the login credentials needed to access the other server).

Integrated logon to multiple Stores from the Web Receiver is achievable by introducing Single Sign-On ("SSO") trust links between the Stores (which could be designed to allow secure password sharing between Stores), or simply by using a standard Identity Provider ("IdP") that is trusted by all of the Stores if password sharing is not required (e.g., if using a Federated Authentication Service ("FAS") for launch, or a mechanism like Receiver SSON or smart card pass-through).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for automated address failover for a computing device, comprising:
    accessing a cloud service by the computing device;
    performing system caching operations by the computing device to locally store (a) an offline copy of a StoreFront web User Interface ("UI") for a main StoreFront provided by the cloud service and (b) a plurality of Cloud Connector addresses;
    transmitting a silent request from a Receiver of an Application/Desktop delivery solution being executed by the client computing device to each of the cloud service and the plurality of Cloud Connector addresses;

operating the Receiver using an address for the cloud service for web Application Programming Interface ("API") calls to the main StoreFront, if the cloud service responded to the silent request; and operating the Receiver or a Webview using one of the plurality of Cloud Connector addresses that is associated with a reachable Cloud Connector for web API calls to a backup StoreFront, if the cloud service did not respond to the silent request.

2. The method according to claim 1, wherein the system caching operations are performed by a Web Browser, the StoreFront web UI, or the Receiver of the Application/Desktop delivery solution.

3. The method according to claim 1, wherein the Receiver is a Web Receiver or a Native Receiver.

4. The method according to claim 1, further comprising performing loading operations by the computing device to load the offline copy of the StoreFront web UI at least when the cloud service is unreachable.

5. The method according to claim 1, further comprising generating a list of addresses associated with at least one of the cloud service and Cloud Connectors that responded to the silent request.

6. The method according to claim 1, further comprising authenticating the reachable Cloud Connector prior to when the web API calls are made to the backup StoreFront.

7. The method according to claim 1, further comprising repeating the transmitting each time a new StoreFront session is started.

8. The method according to claim 1, further comprising repeating the transmitting each time a user-software interaction is received to perform an operation via the Receiver or Webview.

9. The method according to claim 8, wherein the operation comprises an application launch or an application refresh.

10. A system, comprising:
a processor; and
a non-transitory computer-readable storage medium comprising programming instructions that are configured to cause the processor to implement a method for automated address failover, wherein the programming instructions comprise instructions to:
access a cloud service;
perform system caching operations to locally store (a) an offline copy of a StoreFront web User Interface ("UI") for a main StoreFront provided by the cloud service and (b) a plurality of Cloud Connector addresses;

transmit a silent request from a Receiver of an Application/Desktop delivery solution to each of the cloud service and the plurality of Cloud Connector addresses;

operate the Receiver using an address for the cloud service for web Application Programming Interface ("API") calls to the main StoreFront, if the cloud service responded to the silent request; and operate the Receiver or a Webview using one of the plurality of Cloud Connector addresses that is associated with a reachable Cloud Connector for web API calls to a backup StoreFront, if the cloud service did not respond to the silent request.

11. The system according to claim 10, wherein the system caching operations are performed by a Web Browser, the StoreFront web UI, or the Receiver of the Application/Desktop delivery solution.

12. The system according to claim 10, wherein the Receiver is a Web Receiver or a Native Receiver.

13. The system according to claim 10, wherein the programming instructions further comprise instructions to load the offline copy of the StoreFront web UI at least when the cloud service is unreachable.

14. The system according to claim 10, wherein the programming instructions further comprise instructions to generate a list of addresses associated with at least one of the cloud service and Cloud Connectors that responded to the silent request.

15. The system according to claim 10, wherein the programming instructions further comprise instructions to authenticate the reachable Cloud Connector prior to when the web API calls are made to the backup StoreFront.

16. The system according to claim 10, wherein the silent requests are transmitted each time a new StoreFront session is started.

17. The system according to claim 10, wherein the silent requests are transmitted each time a user-software interaction is received to perform an operation via the Receiver or Webview.

18. The system according to claim 17, wherein the operation comprises an application launch or an application refresh.

* * * * *